Aug. 10, 1937.                B. LOEFFLER                    2,089,278
                        AIR VALVE FOR DIESEL ENGINES
                        Filed June 4, 1935          2 Sheets-Sheet 1
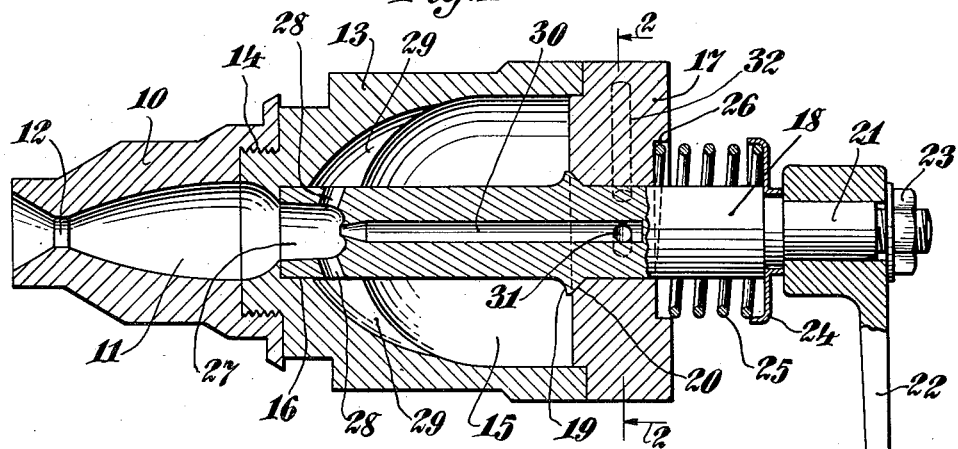
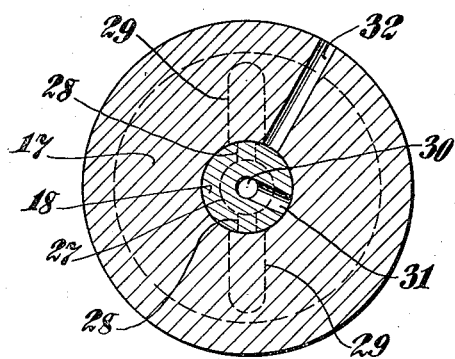
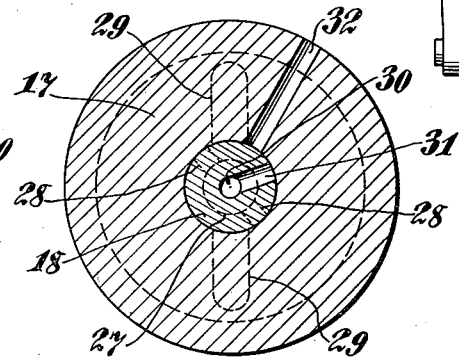
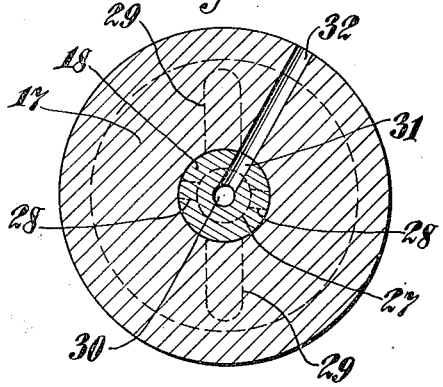
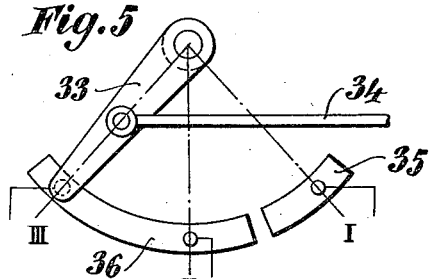
INVENTOR.
Bruno Loeffler,
BY Hoguet, Neary & Campbell,
HIS ATTORNEYS Patented Aug. 10, 1937

2,089,278

UNITED STATES PATENT OFFICE 2,089,278

AIR VALVE FOR DIESEL ENGINES

Bruno Loeffler, Plainfield, N. J., assignor to International Motor Company, New York, N. Y., a corporation of Delaware Application June 4, 1935, Serial No. 24,823

3 Claims. (Cl. 123—179)

The present invention relates to internal combustion engines and embodies, more specifically, an improved air valve for use particularly in connection with internal combustion engines of the Diesel type. More specifically, the invention embodies an air valve for use in Diesel engine structures wherein the air and fuel under compression in a Diesel engine may be controlled in such fashion that a portion thereof may be confined within a relatively limited region or, at will, directed into larger chambers or the atmosphere, depending upon the particular requirements of various operating phases of the engine.

In certain forms of Diesel engines, combustion chambers are provided which communicate with the cylinders of the engines and constitute relatively restricted chambers within which a considerable volume of air and fuel is forced during the compression stroke of the engine to build up a sufficiently high compression to ignite the fuel. These combustion chambers usually communicate with the top of the cylinder and are formed in the engine head. Moreover, current Diesel designs include engines wherein additional chambers are provided which communicate with the above mentioned combustion chambers. These additional chambers may be termed "air chambers" and serve to increase the effective volume of the combustion chambers to answer, more fully, the requirements of the engine during the normal running operation.

As a further feature, certain current forms of Diesel engines are not only provided with the foregoing combustion and air chambers, but are provided with valve mechanism by means of which the flow of fluid between and through such chambers may be effectively controlled. By providing means by which the fluid within these chambers may be exhausted to the atmosphere under certain conditions, as well as confined to the combustion chamber or the combustion and air chambers selectively, the complete cycle of operation is materially improved. The cranking operation is facilitated by the provision of means to vent both chambers to the atmosphere; the starting operation is improved by the provision of means to confine the compressed fluids to the combustion chamber; and the running operation is improved by the provision of means to establish communication between the combustion and air chambers.

Heretofore, this mechanism has taken the form of a manually operated valve which is advanced against one seat from its normally open and cranking position to confine the gases within the combustion chamber and seat the same in its starting position. After the engine is started, the valve is then retracted to its third or running position. Motion of the valve to its third position brings the valve mechanism through its first or cranking position. In view of this characteristic, these presently available valves, in being moved from the starting to the running positions thereof, have permitted the burning gases to blow past the combustion and air chambers and into the atmosphere. The disadvantage of this is obvious and it is an object of the present invention to provide a valve mechanism by means of which the operation of the engine may be effected through cranking, starting, and running phases, without the objectionable blowing of burning gases into the atmosphere.

A further object of the invention is to provide a valve mechanism of the above character wherein the valve is movable into at least three positions without passing through its cranking position to reach subsequent positions in operating sequence.

A further object of the invention is to provide an air valve for Diesel engines wherein the valve is moved consecutively into cranking, starting, and running positions in the continuous motion of the valve in one direction.

A further object of the invention is to provide a valve of the above character wherein the valve is effectively seated in fluid-tight relationship with the engine structure to prevent gases from escaping from the engine during normal running operation, at the same time providing an effective valve between the air and combustion chambers in the engine head.

The foregoing objects are attained in one form of the invention, by the provision of a rotary valve having port formations of such character as to permit the foregoing positions of the valve to be reached by continuous motion of the valve in one direction, the valve being of elongated nature and extending through the chamber most remote from the cylinder to form a valve between the chambers, as well as a valve between the combustion chamber and the atmosphere.

Further objects of the invention will be apparent as it is described in greater detail in connection with the accompanying drawings, wherein—

Figure 1 is a view in section, taken through the axis of a valve constructed in accordance with the present invention;

Figure 2 is a view in section, taken on line 2—2 of Figure 1 and looking in the direction of the arrows, this view showing the valve in its running position;

Figure 3 is a view in section, similar to Figure 2, and showing the valve mechanism in starting position;

Figure 4 is a view in section, similar to Figure 2, showing the valve mechanism in cranking position;

Figure 5 is a schematic representation of the mechanism by means of which the valve may be tied in with the controls for the injector and starting motor to prevent improper operation of the mechanism;

Figure 6:
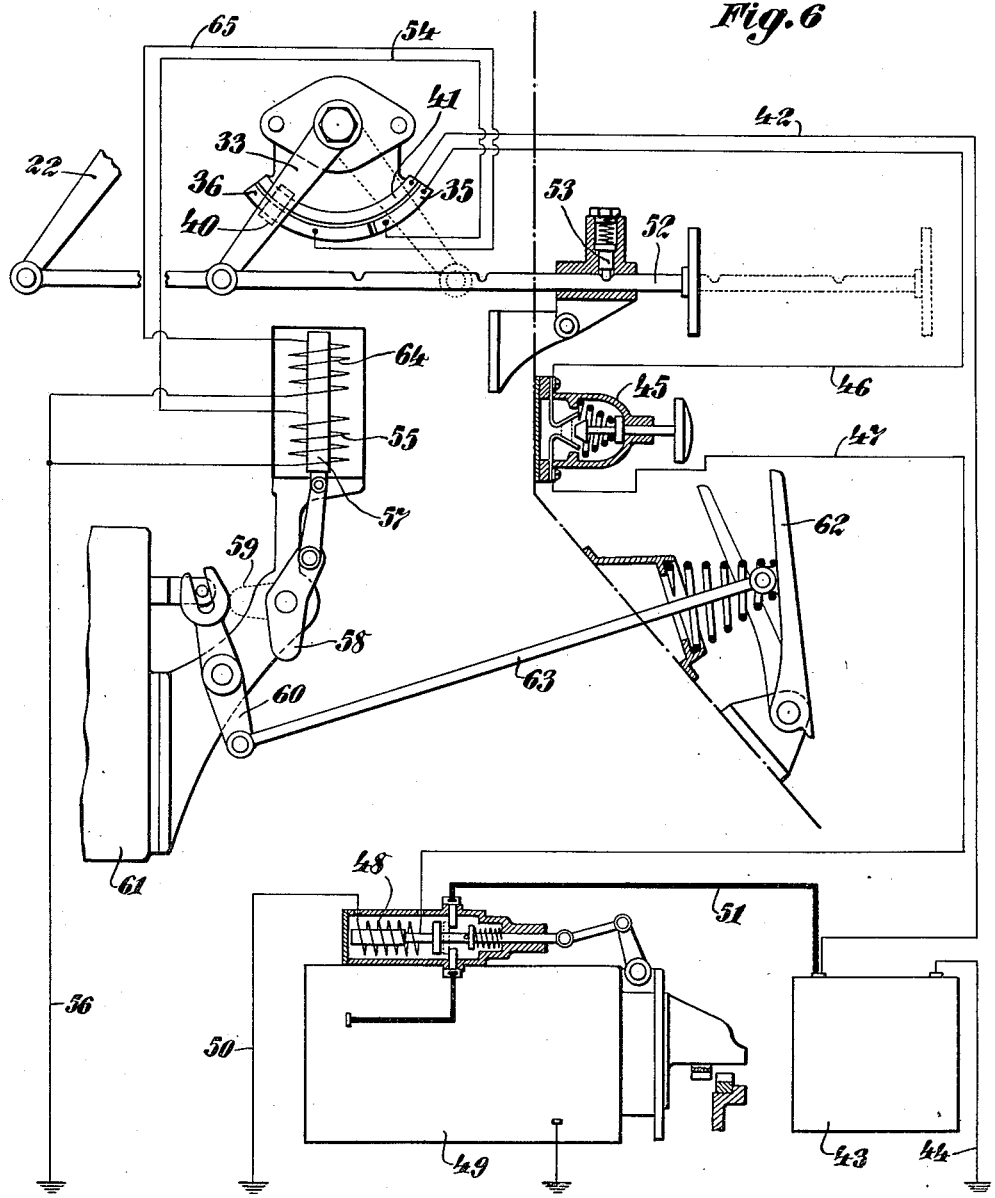
Figure 6 is a diagrammatic illustration of the manner in which the present invention operates.

With reference to the above drawings, only so much of the engine head is shown as to illustrate the present invention and, accordingly, the head is formed with a portion 10 within which a combustion chamber 11 is formed. This combustion chamber may communicate with the cylinder through a restricted orifice 12, the dimensions and formation of which may vary in accordance with practice.

A housing 13 may be carried by the head and support the portion 10, the latter being threaded on the housing as indicated at 14. Within the housing 13, an air chamber 15 is formed, a valve seat 16 being formed at the end of the housing adjacent the combustion chamber. The air chamber 15 is closed by a plate 17 which carries a rotatable valve 18, having a circumferential flange 19 formed thereon to engage a valve seat 20, formed in the plate 17. The outer end of the valve 18 is formed with a stub shaft 21 upon which a crank 22 may be mounted, a nut 23 serving to secure the crank to the shaft 21. The crank 22 serves as an operating means for the valve and also locates a collar 24 against which a spring 25 is seated. The spring 25 serves as a means for maintaining the flange 19 against the seat 20 and thus preserve a fluid-tight contact between the plate 17 and the valve 18. If desired, a recess 26 may be formed in the plate in order that the spring 25 may be effectively seated at both ends.

At the inner end of the valve 18, a chamber 27 is formed, the chamber being provided with outwardly extending passages 28 which are adapted to communicate with recesses 29 formed within the housing 13. Inasmuch as the recesses 29 communicate with the air chamber 15, communication between the combustion chamber 11 and air chamber 15 is established through the chamber 27 and passages 28 when the valve 18 is adjusted in the proper radial position.

An axial passage 30 extends from the chamber 27 to a radially extending passage 31. This passage lies in the plane of a passage 32, formed in the plate 17.

It will thus be seen that the crank 22 may be moved to aline passages 31 and 32 and thus establish communication between the combustion chamber 11 and the atmosphere to break the compression within the cylinder and thus facilitate the cranking operation of the engine. In this position of the valve, as illustrated in Figure 4, the passages 28 are closed.

Motion of the valve and crank 22 in a clockwise direction, as viewed in Figures 2, 3, and 4, will close the passage 31 and thus bring the mechanism into the starting position, at which time the combustion chamber 11 communicates with the cylinder and the communication between the combustion chamber and atmosphere, as well as between the combustion chamber and air chamber 15, is broken. Figure 3 illustrates the position of the valve during the starting operation.

Further motion of the valve in the same direction moves the ports 28 into communication with the recesses 29 and establishes communication between the combustion and air chambers. This position of the valve corresponds to the normal running position and is illustrated in Figure 2. Obviously, the passage 31 remains closed.

In order that the starting motor may function to the exclusion of the injector pump an interlock is provided between the valve operating member and suitable control mechanism. As illustrated in Figure 5, this interlock may be effected electrically by the provision of a switch mechanism including a movable switch arm 33, connected to the crank 22 by means of a link 34. The switch arm is adapted to engage switch segments 35 and 36, the segments being insulated from each other. Segment 35 may be connected electrically to the starting motor while segment 36 is connected to the injector pump. The total arcuate length of the segments 35 and 36 should equal the travel of the movable switch element 33 and the parts are so constructed as to cause the switch arm 33 to engage the segment 35 when the valve is in its cranking position. At this time the starting motor functions, the combustion chamber 11 communicating with the atmosphere to permit the inertia elements to be brought up to speed. Inasmuch as the connection between segment 36 and the movable switch member 33 is broken, the injector pump cannot operate during the cranking operation.

Upon movement of the valve to the starting position, the movable switch element 33 rides off of the segment 35 and the starting motor is disconnected. Connection is then established between the movable switch member 33 and the segment 36 and the injector is allowed to function. During both the starting and running operations, the starting motor is disconnected and thus the improper functioning of these elements is avoided.

In Figure 6 there has been illustrated diagrammatically the manner in which the present invention operates. The various elements, including the fuel pump, starting motor, and connections form no part of the present invention but merely serve to illustrate the manner in which the same operate. In this diagrammatic illustration, the switch arm 33 is provided with a wiping contact member 40 which engages the segments 35 and 36 and which also engages a contact strip 41. A wire 42 connects the strip 41 with a battery 43 which is grounded by means of a connection 44. Contact segment 35 is connected to a starting switch 45 by means of a wire 46, a wire 47 also connecting the starting switch 45 with a starting relay 48 on the starting motor 49. The relay is grounded by means of the wire 50 and serves to connect the starting motor to the battery through bus connection 51.

An operating rod 52 is provided for moving the arms 22 and 33 into the desired positions, a spring pressed detent 53 being provided to hold the elements in any of the desired operating positions.

A wire 54 connects segment 35 with a coil 55, coil 55 being connected to a ground wire 56. An armature 57, actuated by the coil 55, serves to operate a lock member 58 which is moved into the dotted position illustrated at 59 to lock an operating lever 60 of a fuel pump 61 against operation. The operating lever 60 is adapted to be actuated by a foot pedal 62 through a connecting link 63 in order that the fuel pump may be manually controlled in a well known fashion.

Contact segment 36 is connected to a coil 64 by means of a wire 65, coil 64 being also connected to the ground wire 56. Coil 64 is adapted to move the armature into the position shown in full lines in Figure 6, thus permitting free operation of the fuel pump.

When the operating rod 52 is in the position shown in full lines, the elements are in the position shown in the drawings and the engine is running under normal conditions. At this time the foot pedal 62 enables the fuel pump to vary the fuel supply and increase or decrease the engine speed as desired. Inasmuch as the contact 35 is disconnected from a segment 41, the starting switch 45 is ineffective under the foregoing conditions.

When the operating rod 52 is moved into the position shown in dotted lines, the starting switch 45 is connected in the battery circuit through the contacts 35 and 41 and the coil 55 is energized to prevent operation of the fuel pump.

It will be seen that the foregoing valve moves through the three successive positions thereof without establishing communication between the combustion chamber and the atmosphere during the time when the injector functions. In this fashion, blowing of the burning gases into the atmosphere is avoided and a smoother and more effective operation results. Inasmuch as the spring 25 maintains the flange 19 against the seat 20, the valve is fluid-tight.

While the invention has been described with specific reference to the construction shown in the accompanying drawings, it may obviously be embodied in modified structures and is not to be limited, save as defined in the appended claims.

I claim:

1. In combination with a Diesel engine head having a combustion chamber, an air chamber and a valve port therebetween, a valve comprising a movable member constantly engaging the port, said valve being formed with a passage adapted to establish communication between the two chambers and a passage adapted to establish communication between the combustion chamber and the atmosphere, means to rotate the valve, a starting motor, an injection pump, control means for the starting motor and injection pump, and means operated by the means to rotate the valve to permit operation of the starting motor only when the valve establishes communication with the atmosphere and to prevent operation of the injection pump when communication with the atmosphere is established.

2. In combination with a Diesel engine head having a combustion chamber, an air chamber and a valve port therebetween, a valve comprising a movable member constantly engaging the port, said valve being formed with a passage adapted to establish communication between the two chambers and a passage adapted to establish communication between the combustion chamber and the atmosphere, means to rotate the valve, a starting motor, an injection pump, and an electrical switch actuated by the valve rotating means having contacts and connections with the starting motor and injection pump to permit operation of the starting motor only when the valve establishes communication with the atmosphere and to prevent operation of the injection pump when communication with the atmosphere is established.

3. In combination with a Diesel engine head having a combustion chamber, an air chamber and a valve port therebetween, valve mechanism to establish communication between the two chambers and to establish communication between the combustion chamber and the atmosphere, means to actuate the valve, a starting motor, an injection pump, control means for the starting motor and injection pump, and means operated by the means to actuate the valve to permit operation of the starting motor only when the valve establishes communication with the atmosphere and to prevent operation of the injection pump when communication with the atmosphere is established.

BRUNO LOEFFLER.